United States Patent [19]

Roberts

[11] Patent Number: 4,718,587
[45] Date of Patent: Jan. 12, 1988

[54] CAR-TOP CARRIER TO ALLOW CONVERSION TO SMALL UTILITY WATERCRAFT

[76] Inventor: Hubert H. Roberts, 779 Lower Donnally Rd., Charleston, W. Va. 25304

[21] Appl. No.: 881,213

[22] Filed: Jul. 1, 1986

Related U.S. Application Data

[63] Continuation of Ser. No. 697,629, Jan. 30, 1985, which is a continuation-in-part of Ser. No. 544,739, Oct. 24, 1983.

[51] Int. Cl.⁴ .............................................. B60R 9/00
[52] U.S. Cl. ................................... 224/328; 114/352
[58] Field of Search ............... 114/352, 353, 354, 355; 224/42.01, 309, 328, 273

[56] References Cited

U.S. PATENT DOCUMENTS

| | | | |
|---|---|---|---|
| 1,449,222 | 3/1923 | Goethal | 114/352 |
| 3,090,973 | 5/1963 | Levinson | 114/353 X |
| 3,916,468 | 11/1975 | Tetreault et al. | 114/352 |
| 4,522,145 | 6/1985 | Stone | 114/352 |
| 4,693,203 | 9/1987 | Lewis | 114/353 |

Primary Examiner—Henry J. Recla
Assistant Examiner—David Voorhees
Attorney, Agent, or Firm—Hall, Myers & Rose

[57] ABSTRACT

An improved design of Car-Top Luggage Carrier to allow conversion to small utility watercraft included:

(1) A cover or bow section that substantially encapsulates or interlocks with the carrier or stern section.
(2) Interlocking parts for unitization or joining the bow and stern sections.
(3) Double keel design as points of contact for the carrier with the transporting vehicle.
(4) Method of attachment that utilizes an arrangement of perforated straps, hook bolts and car roof gutter fittings.

19 Claims, 22 Drawing Figures

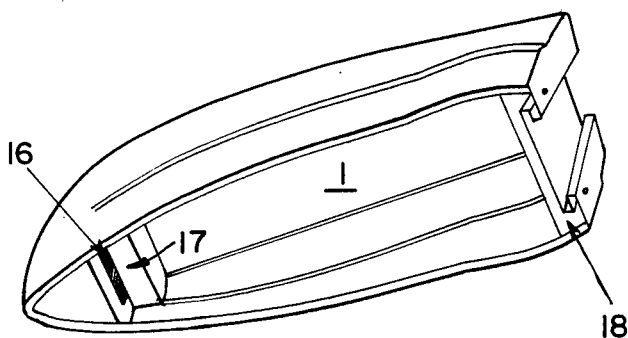
FIG. 12
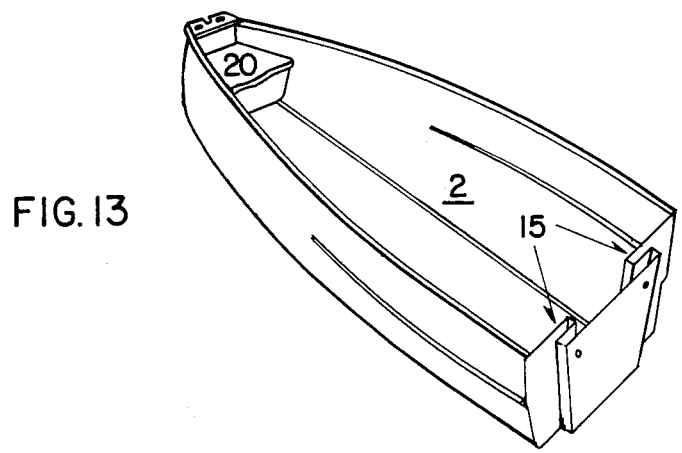
FIG. 13
FIG. 14
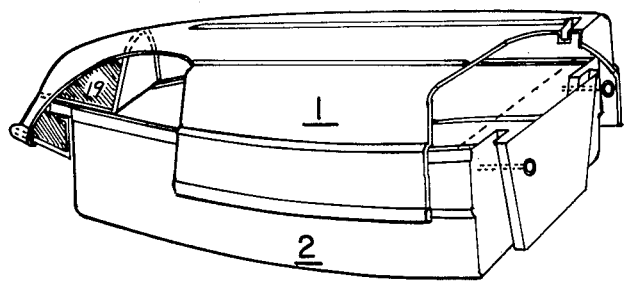

CAR-TOP CARRIER TO ALLOW CONVERSION TO SMALL UTILITY WATERCRAFT

CROSS REFERENCE TO RELATED APPLICATION

This is an application for continuation of Ser. No. 697,629, filed Jan. 30, 1985, which is in turn a continuation-in-part of my application Ser. No. 544,739 filed Oct. 24, 1983. There are no other related applications.

FEDERAL-SPONSORED RESEARCH AND DEVELOPMENT

There is no Federal-sponsored research or development related to this invention.

BACKGROUND OF INVENTION (1) Field of Invention

The present invention relates to car top carriers. The object of this invention is to provide an improved design of a car top luggage carrier that can readily be converted to a small utility type watercraft.

The primary area of search for this invention is Class 224/42.01 "Package and Article Carriers-Convertible". A second area of search was Class 190/1 "Trunks and Hand Carried Luggage-Convertible". Because of the watercraft nature of this invention, Class 114/352 "Ships-Sectional"; Class 114/353 "Ships-Folding" and Class 114/354 "Ships-Collapsible" were also searched.

(2) Description of the Prior Art

The concept of construction of a package or material's carrier that can be converted to a boat is fairly old. One of the earliest, Olmstead, No. 67,342, granted in July, 1867, presented a sectional boat that converted to a trunk. Numerous folding boats have been the subject of invention as Auto Trailers with a combination purpose of carrying camping equipment, luggage, baggage, etc. An early example of this is Gibbs, No. 1,560,983 granted in November, 1925. Reese, No. 1,781,860, an early combination luggage carrier and collapsible boat that was attached to the rear of an auto, was granted in June, 1930. One of the latest improvements of this concept is Johnson, No. 3,684,139, granted August, 1972, which shows a foldable boat also usable as a luggage carrier or a temporary shelter. The improvements or inventions attempting to avail of this concept have evidently not been sufficient to justify commercial development.

Witness the fact that during the vacation season and weekends, there may be tens of thousands of car top luggage carriers on the highways and a like number of canoes and small boats being car topped but no combination or convertible versions of these two visible.

The subject invention is readily distinguishable from Class 114/353 "Ships-Folding" in that there is no "folding" aspect to this invention. Instead, the top portion of the subject invention substantially encases the lower portion, whereas the "folding boats" generally utilized the gunnales of the respective parts as matching parts that use either gaskets or flanges to seal out the weather and dust.

The subject invention can be readily distinguished from Class 114/354 "Ships-Collapsible" in that there is nothing of a collapsible nature in its construction. Conceptually, there are similarities to prior art found in Class 114/352 "Ships-Sectional" which included in excess of 70 prior patents, however, none of these contained the feature of substantial encapsulation or encasement of the carrier or stern section of the watercraft mode of the invention by the bow or cover section, thus our primary area of prior art to be distinguished is Class 224/42.01 "Package and Article Carriers-Convertible" with additional consideration required for Class 190/1 "Trunks and Hand Carried Luggage-Convertible". The following patents should be specifically distinguished. They are not considered as prior art that anticipates the subject invention.

(i) Sweetman—No. 2,659,464 granted Nov. 17, 1953 can readily be distinguished from the subject invention in that this was merely a canoe cut in half with flanged gunnales that coincided. In the best mode, the parts were fastened together by a semi-hinged arrangement and latches. In the luggage carrier mode, it was supported on the car by built-in feet and straps, all of which is readily distinguishable from the subject invention in detail and configuration. Sweetman clearly does not anticipate the subject invention.

(ii) Johnson—No. 3,684,139 granted Aug. 15, 1972 is a hinged box like luggage carrier with the gunnales of the respective parts coinciding when the structure is used as a luggage carrier. When used as a boat, the two respective parts are attached by hinges and pins. The subject invention is not anticipated by Johnson and bears no resemblance to it.

(iii) Wray—No. 3,685,061 granted Aug. 22, 1972 consists merely of an inverted boat attached on top of an automobile by various devices which can also be used as a camper. The base is utilized for a bed and sleeping compartment with the boat section as a roof. No anticipation of utilization of the base and the top as component parts of a boat is anticipated. Wray can be readily distinguished from the subject invention in detail, configuration, design and function.

(iv) Swenson—No. 2,684,796 granted July 27, 1954 consists of a rack-type base for the luggage carrier, not utilized as any part of the boat, all of which is covered by an inflatable innertube or hollow metal type boat which is round in appearance and bears no resemblance to the subject invention and clearly does not anticipate the subject invention.

(v) Tope—No. 3,301,449 again consists merely of an inverted boat that fits over top of a base utilized as a car top luggage carrier. No part of the base is utilized as a sectional boat, nor are there any observable common features between Tope and the subject invention. Tope clearly does not anticipate the subject invention.

(vi) Thomas—No. 1,345,416 granted July 6, 1920, is an early vintage patent that includes the concept of a sectional boat and a trunk. No anticipation of car topping by this patent is noted. It is a four section boat held together by various and sundry hinges and latches and is no way similar to the subject invention.

(vii) Olmstead—No. 67,342 granted in July of 1867, was a three sectional boat that could be converted to a trunk. It was attached together by hinges and pins, is totally different in appearance to the subject invention and does not appear to include any common details or functional qualities similar to the subject invention and therefore clearly does not anticipate the subject invention.

(viii) Reese—No. 1,781,860 granted Nov. 18, 1930 was a combination luggage carrier and collapsible boat that attached to the rear of an automobile. It consisted of three sections joined together by pins and hooks in a boat combination and includes no common details with the subject invention. In appearance and function it is substantially dissimilar and clearly does not anticipate the subject invention.

(ix) Edwards—No. 3,357,031 is a camping and boat outfit that attaches to the top of an automobile with the lid converting to a table. The boat part of the structure is utilized as the floor of a tent. Edwards does not anticipate a sectional boat convertible to a luggage carrier but merely utilizes the boat to carry the other functional component parts.

SUMMARY OF INVENTION

The invention or improvement, the subject of this Application for Continuation in Part, will be described in sufficient detail by the Description of Drawings, the Detailed Description and the Claims that follow hereafter. Among others, a distinguishing feature of this invention from prior art is its simplicity in manufacture and utilization. Attachment to a car top is accomplished by use of standard equipment commonly used and generally available today. Manufacture of polyethelene, PVC, ABS or fiberglass models would require molding of only two major parts and four minor parts plus moldings and hardware. To convert from a carrier to a watercraft and vice versa involves only the insertion and tightening of two eye bolts. As a summary or general description of the invention envisioned, it may be described as:

A plurality of parts comprising of two dissimilar rigid hollow thin shell containers, each including respectively, a bottom, two sides, two ends, with an open top. Each will require installation or attachment of certain appropriate parts to accommodate its function.

The two major parts can be constructed of high density polyetheline, aluminum, PVC, ABS fiberglass or any other comparable materials or combinations thereof.

These two sections are designed in a way to facilitate their combination and utilization as either a car top carrier, hereinafter referred to as the carrier mode, or a small utility type watercraft, hereinafter referred to as the watercraft mode.

In the carrier mode, the bottom is designated the carrier and the top, the cover. In the watercraft mode these parts are designated the stern section and the bow section, respectively.

The carrier or stern section is somewhat smaller than the cover or bow section to allow the cover to substantially encapsulate the carrier, over lapping or interlocking approximately one-half of the respective heights of each.

The cover shall have an interior cove or indent along each side that coincides with the top edges or gunnales of the carrier when the two are used in the carrier mode. This serves two functions: first, as a stop to seat the cover on the carrier, and second, to help seal the carrier from weather and road dust. Each end of the cover shall have an interior shelf or ledge that will act as a stop that rests on the top edge of the respective ends of the carrier.

When combined in the watercraft mode, the bow section and the stern section shall be joined at the union end of each by interlocking parts; the stern section being the male part and the bow section the female part. This union shall be further secured by two large eye bolts inserted through holes above the normal water line, first through the bow section and then tightened into built-in threads in the stern section. In a reverse direction these same holes shall align to allow insertion of the eye bolts and engagement of built-in threads to secure the cover to the carrier when in the carrier mode.

DESCRIPTION OF DRAWINGS

FIGS. 12 and 13 are perspectives of the cover and carrier in their respective positions just prior to assembly in the carrier mode.

FIG. 14 is a cut away perspective drawing showing the method of assembly of the cover and carrier in the carrier mode.

Figure 1:
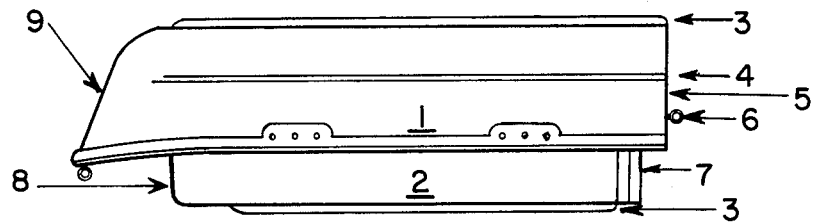
FIG. 1 is a plan view of the subject invention in the carrier mode, viewed from the side. The cover or bow section is designated as (1) and the carrier or stern section is designated as (2).
Figure 2:
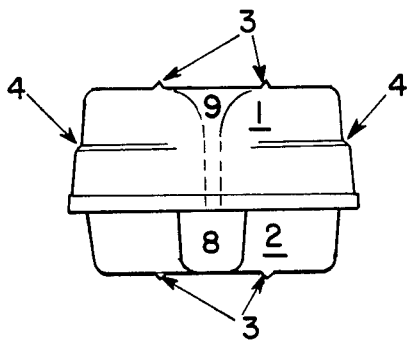
FIG. 2 is a plan view of the subject invention in the carrier mode, showing the front of the cover or bow section and the rear of the carrier or stern section.
Figure 3:
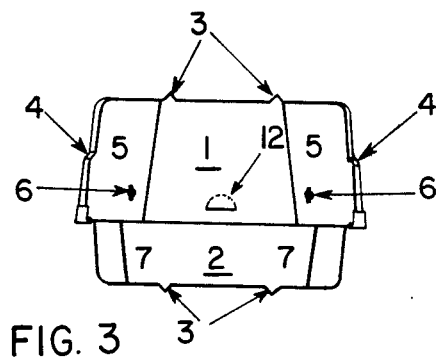
FIG. 3 is a plan view of the union ends of the subject invention in the carrier mode.
Figure 4:
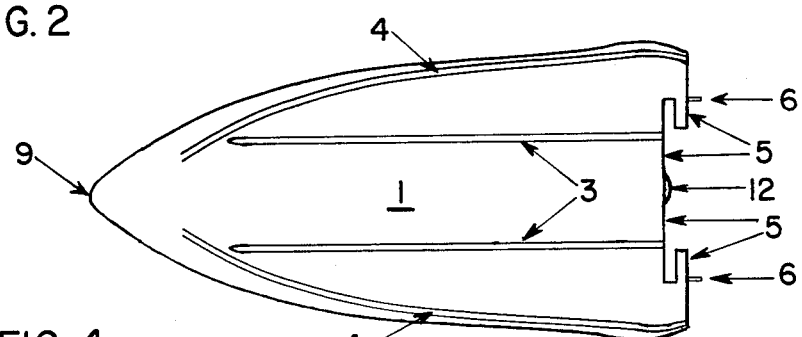
FIG. 4 is a plan view of the bow section or cover in the carrier mode taken from the top.
Figure 5:
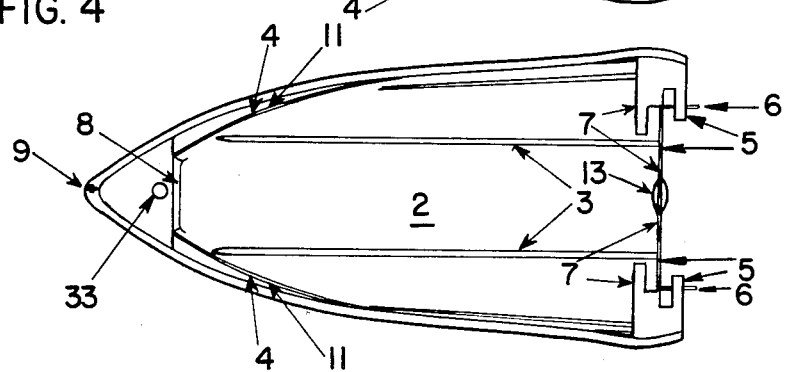
FIG. 5 is a plan view of the carrier mode taken from the bottom.

33 shown at FIG. 5 is a mast hole built into the prow area of the bow section to allow utilization of a sailing rig.

DESCRIPTION OF PREFERRED EMBODIMENTS

For clarity purposes the preferred embodiments of the subject invention can best be expressed, first, as to its general objectives and usage and, second, the specific function of its component parts and special features. The following description of preferred embodiments is so headnoted.

(1) General Objectives and Usage

The general objective of the subject invention is to provide the design and development of a car top luggage carrier that can readily be converted into a versatile small utility type watercraft. The versatility of this watercraft is demonstrated by its potential use as a canoe, a row boat, a small motor skiff or a sail boat without modification. Only the installation or addition of readily available fixtures and parts is required to allow this varied use. The plan drawings submitted with this Application for Continuation in Part are to scale (approximately 1 to 20) and represent a watercraft approximately 10 feet 6 inches in length, 36 inches in width at the center of the beam, and 16 inches in depth, providing a capacity of approximately 450 lbs. as a watercraft. As a luggage carrier, it has a capacity of 13 to 15 cubic feet. These dimensions are demonstrative only and may be varied to accommodate more specific requirements. When not utilized in either the carrier mode or the watercraft mode, the subject invention can obviously be utilized for casual storage purposes.

(2) Specific Features and Functions of Component Parts

As heretofore stated, the two major component parts of the subject invention are the cover or bow section, shown as 1 on FIGS. 1 through 14 and the carrier or stern section shown as 2 on FIGS. 1 through 14. The respective functions of these two parts will become obvious from the preceding comments, examination of the attached drawings and the subsequent descriptive language.

The double keel is designated 3 on FIGS. 1 through 8 and serves three functions, namely: it adds rigidity to the two major parts; it adds stability to the invention in the watercraft mode; and it serves as contact points for the carrier with the top of a vehicle or a rack when in the carrier mode.

4 in FIGS. 1 through 8 is the interior cove or indent along the side and inside the cover that is congruent with and in contact with the top edge of the carrier 11 in the carrier mode and serves to seal the carrier and protect its contents from weather and road dust. The cove or indent also adds rigidity to the sides of the cover. The cove or indent design is continued on the sides of the carrier to allow a match up of the union ends of the major parts in the watercraft mode. This is for appearance purposes and adds rigidity to the sides of the carrier. Overall, this cove or indent design also adds stability when the invention is in the watercraft mode.

5 and 7 in FIGS. 1 through 8 are the interlocking surfaces at the union ends of the major parts that engage each when the invention is in the watercraft mode. These provide rigidity and strength to the union ends and when engaged and seated in the interlocking manner shown on FIGS. 6, 7 and 8 secure the major parts together, prevent lateral movement in this union and prevent vertical movement to some degree by the angled or inclined sides to the interlock. Vertical movement between the interlocking surfaces is further prevented by the insertion and tightening of the security eye-bolts designated as 6 on FIG. 6.

Three eye-bolts are shown on the various drawings. One, at the prow end of the bow is un-numbered. As stated above, the other two are security eye-bolts and are designated 6 on FIGS. 1, 3, 4, 5 and 6. As heretofore stated, the two security eye-bolts are inserted in commonly aligned holes in the major parts and engage built-in threads in the stern section when in the watercraft mode. In the carrier mode, with the bow section in an inverted position in the role of the cover, these same holes and built-in threads are utilized to secure the cover to the carrier. In both modes, the security eye-bolts are first inserted in the holes of the cover or bow section, through the commonly aligned holes in the carrier or stern section, and then tightened into the threads in the latter. The prow eye-bolt, together with the security eye-bolts can also be used as connection points for safety ropes to be fastened to the bumper or other appropriate parts of the transporting vehicle. Thus, with the primary method of fastening to the transporting vehicle that is described hereafter, we have a dual connection as a safety element.

The stern section has a flat end—8 shown on FIGS. 1, 2, 5, 6, 7, and 8. This can be used as a point of attachment for small out-board motors such as electric trolling motors or low horsepower gasoline motors. Thus, we have a built in motor mount.

9 is the prow of the bow section. In addition to the standard function as a prow in the watercraft mode, this also enhances the aerodynamics of the invention in the carrier mode.

Figure 6:
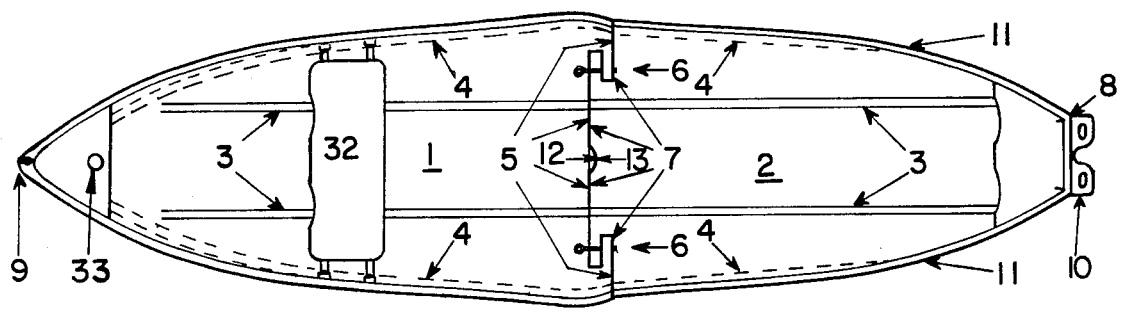
FIG. 6 is a plan view of the stern section and bow section unitized in the watercraft mode, taken from the top.
Figure 7:
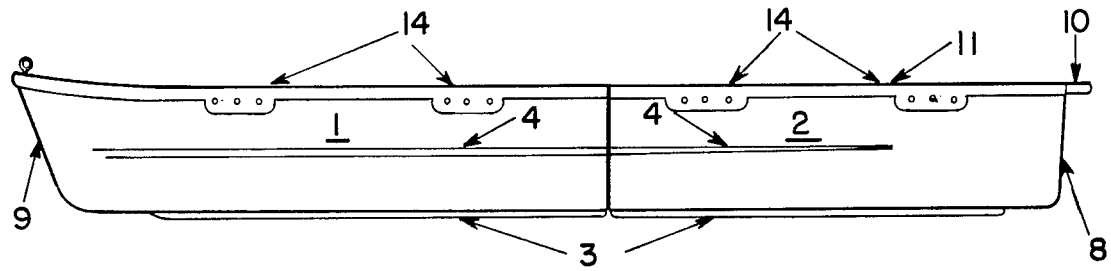
FIG. 7 is a side view of the bow section and stern section unitized in the watercraft mode.
Figure 8:
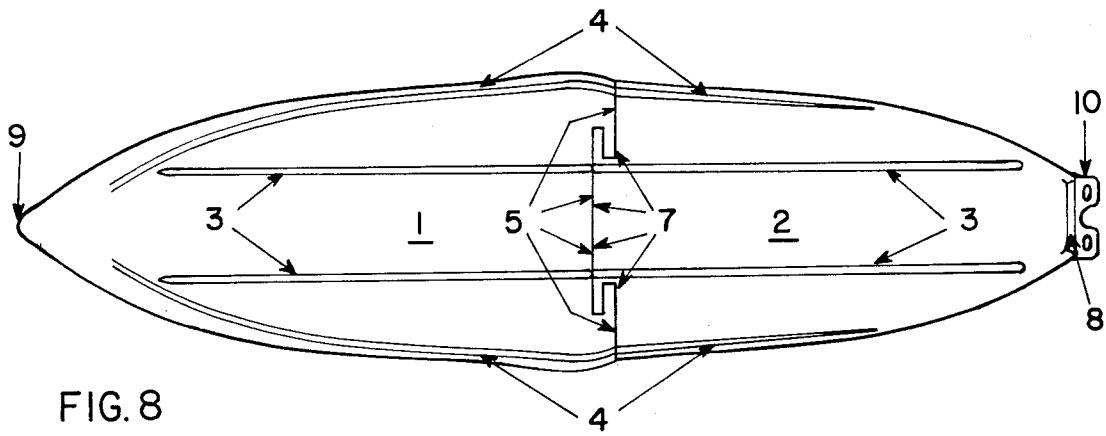
FIG. 8 is the bottom view of the bow section and stern section unitized in the watercraft mode.

A "fan tail" or projection 10 on FIGS. 6, 7 and 8 is either molded or attached to the flat end of the stern section or carrier. In the watercraft mode this serves as points of connection for ropes or lines to tie the watercraft to docks, etc. This is also a convenient handle when assembling or carrying the stern section or the assembled watercraft. Examination of FIGS. 5, 12 and 14 demonstrates the method by which the projection or flat end 8 is engaged in a horizontal slot a recess—16 at FIG. 12—at the prow end of the cover and serves to secure that end of the cover to the carrier when in the carrier mode.

12 and 13 are a protrusion on the bow section and an indentation on the stern section respectively that match and engage each other to aid in aligning the holes in the union ends of each when they are assembled in the watercraft mode. This serves to expedite insertion and installation of the security eye-bolts.

17 and 18 at FIG. 12 are built in shelf like arrangements that serve as rests or stops in the cover which are in contact with the top edge of the ends of the carrier in the carrier mode. These also provide flotation chambers. FIG. 14, a cut away view of the carrier mode shows the location of this flotation and shelf arrangement at the prow end of the cover. The dashed line shown at the cut away view near the union end FIG. 14 is the location of the shelf designated 18. In addition, to providing a flotation chamber, this shelf can be utilized as to center seat in the watercraft mode.

Figure 9:
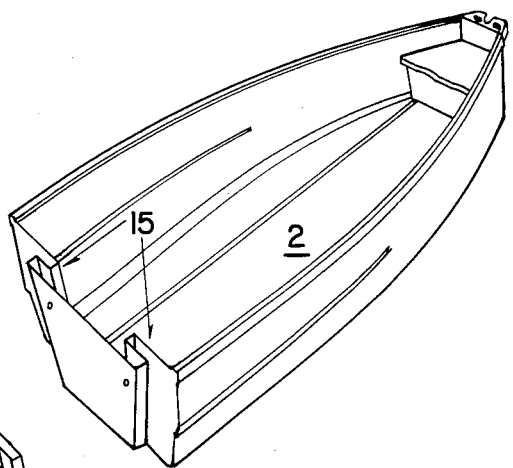
FIGS. 9 and 10 are perspectives of the bow section and stern section in their relative position prior to unitization in the watercraft mode.

20, shown in FIGS. 6, 9 and 13, is a built in seat at the stern end that also is used as a flotation chamber. Thus in summary, there are three built in flotation chambers that are sufficient to make the watercraft mode virtually unsinkable.

Figure 10:
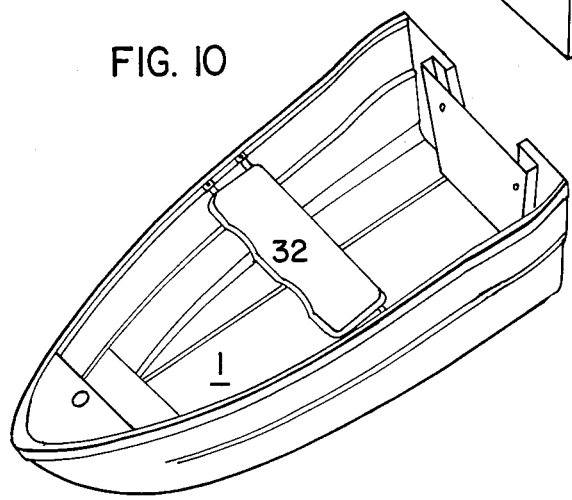
Figure 11:
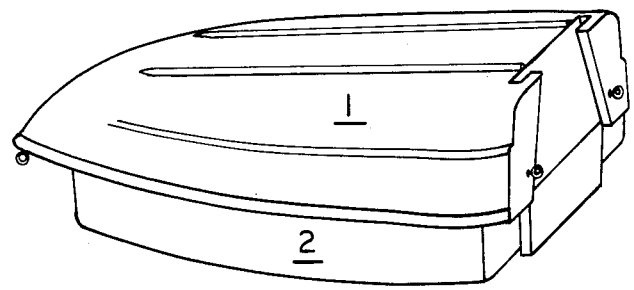
FIG. 11 is a perspective of the subject invention in the carrier mode.
Figure 15:
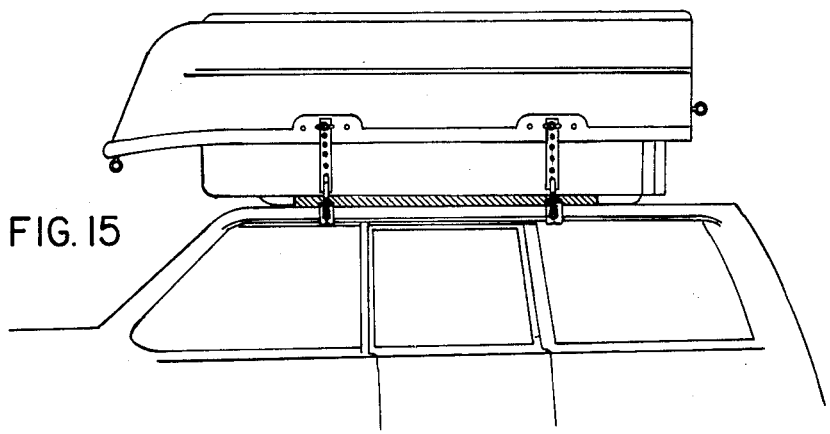
FIG. 15 shows the carrier mode mounted directly on top of a vehicle with the foam rubber cushion and spacer between the bottom of the carrier and the top of the vehicle.

32, shown at FIGS. 6 and 10, is a removable seat for the bow section that has slots in each end of the support members that engage studs in the gunnales.

14, as shown at FIG. 7 (also shown un-numbered at FIGS. 1, 15, 16, 17, 18, 19, 20, 21 and 22) designates eight three-hole accommodations to allow the attachment of the cover and carrier, either directly to the top of a car, or to a car top rack assembly. These may be either enlarged areas of the gunnales or separate fittings attached to the sides of the cover and carrier. The purpose of having three holes at each connection point is to allow different placement of the fastening assemblies according to the length and design of the roof gutters of the transporting vehicle.

FIGS. 15 through 22 demonstrate the method by which the carrier mode may be attached to the transporting vehicle. 14, the eight connection points are unique to the subject invention, otherwise, the depicted methods of attachment utilize standard "off the shelf" hardware. Their arrangement is unique, however. Depending on the size and configuration of the transporting vehicle, there are at least four methods of attachment, namely: (1) attachment of the cover directly to the vehicle (FIGS. 15 through 18); (2) attachment of the carrier to a car top rack assembly (FIGS. 19 through 22); (3) attachment of the cover to a rack assembly; and (4) attachment of the carrier directly to a vehicle.

Figures 16, 17:
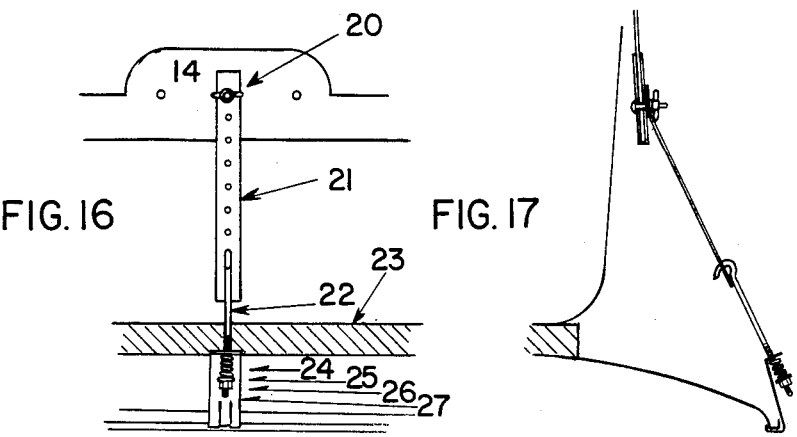
FIG. 16 is a close up side view of the arrangement by which the cover is attached to a vehicle's roof gutter.
FIG. 17 is a close up end view of the arrangement by which the cover is attached to a vehicle's roof gutter.
Figure 18:
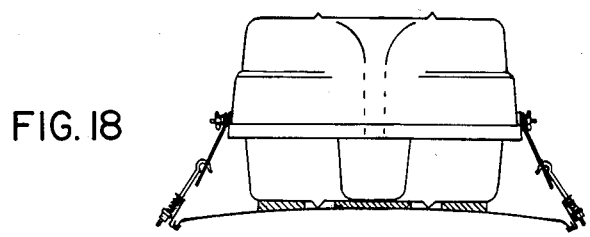
FIG. 18 is an end view showing the carrier mode attached to the roof gutters of a vehicle.
Figure 19:
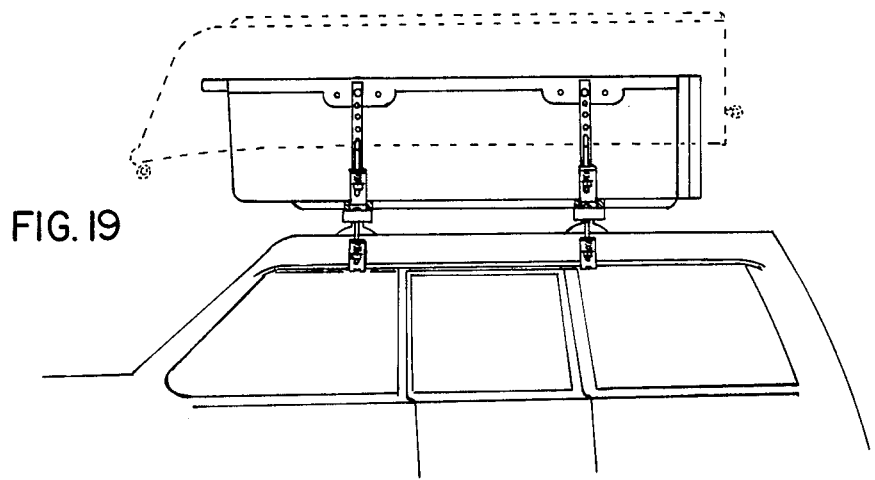
FIG. 19 is a side view of the carrier mode whereby the carrier is fastened to a rack type of assembly attached to the top of a vehicle.

FIG. 16 is a side view of the method of attachment of the cover directly to the roof gutter of a vehicle. The connection to the cover is by a wing-nut and bolt assembly 20 in the middle hole of the connection point 14. The first link in the connection is a perforated steel strap 21. Next is a hook bolt assembly that engages one of the holes in the strap. The thread end of the hook bolt is inserted in the hole of a standard vehicle gutter attachment fitting 27 which is connected to the roof gutter of the transporting vehicle. Tension is maintained on the connection by a spring 24 which is compressed by a washer 25 and a nut 26. Additional tension is provided by foam rubber padding 23 that is compressed between the carrier and the top of the transporting vehicle. The foam rubber padding 23 also serves to limit the movement of the carrier on the vehicle top, provide direct communication between the bottom of the carrier and the vehicle top that will support the bottom of the carrier. A direct attachment of the carrier, as distinguished from the cover can likewise be made, depending upon the spacing and configuration of the transporting vehicle's roof gutter.

Figure 20:
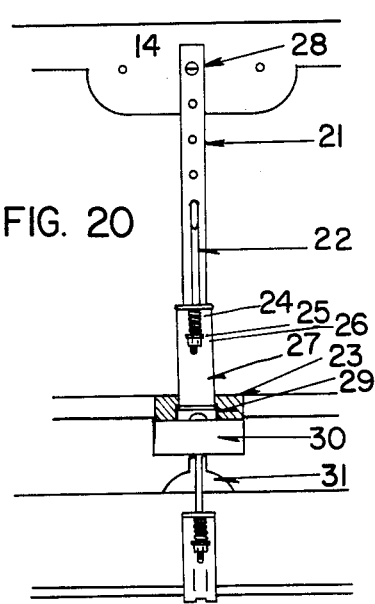
FIG. 20 is a side view of the arrangement by which the carrier is attached to a rack assembly which in turn is fastened to the roof gutters of a vehicle.
Figure 21:
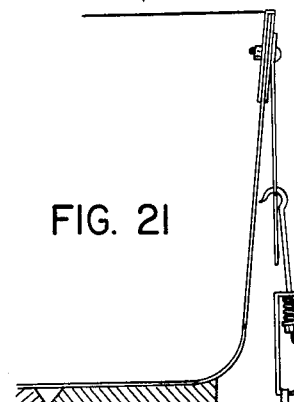
FIG. 21 is an end view of the same.
Figure 22:
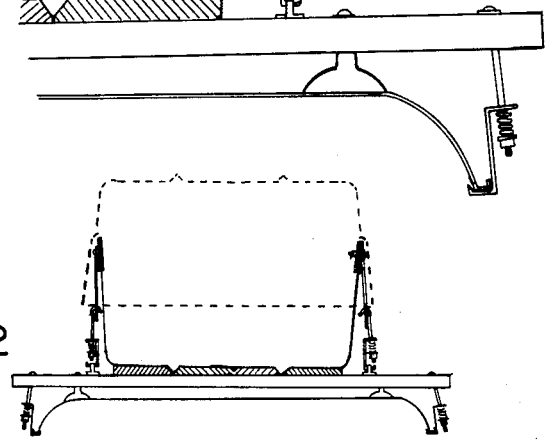
FIG. 22 is an end view showing the carrier fastened to a rack assembly.

FIG. 20 is a side view of the fastening assembly whereby the carrier is fastened to a car top assembly. From the top down, this consists of a standard screw head bolt 28, installed in one of the holes in the points of connection 14, with a lock nut which fastens a length of perforated steel strap 21, to the carrier. Similarly, as described above, a hook bolt 22 is joined with a standard vehicle gutter roof attachment fitting with a compressed spring tension arrangement. The vehicle gutter attachment is connected to a bracket 29 on the cross member of the car top rack. Again, a foam rubber padding is used to cushion the contact point between the carrier and the rack cross member. The cover, as distinguished from the carrier can similarly be attached to a car top rack.

The watercraft contemplated by this invention is in size and shape similar to a small sail boat. A tiller and rudder can readily be attached to the flat end of the stern 8 at FIGS. 1, 2, 5, 6, 7, and 8 and a built in mast hole 33 at FIGS. 5 and 6 is provided for. If lee boards are required, a ready attachment point is found at the center most connection point 14 FIG. 7.

There are several large size car top luggage carriers that are commercially offered in conjunction with small auto trailers. The design and embodiments of the subject invention in its unique way satisfies all the requirements for usage as the carrier part of these carrier auto trailer combinations. Claim 13 herein is intended to cover this aspect of the invention.

What is claimed is:

1. A device usable in a carrier mode in which it acts as a car-top luggage carrier and also usable in a watercraft mode in which it acts as a boat, including:
    two dissimilar hollow thin shelled containers so constructed to allow their union through interlocking parts into a configuration that allows an alternate use as either a car-top luggage carrier, when in the carrier mode, with one of said containers smaller than the other, the smaller container being the carrier when in the carrier mode and the stern section of the watercraft when in the watercraft mode, and the larger container being the cover when in the carrier mode and the bow section when in the watercraft mode,
    said smaller container having an end which acts as the front end of said smaller container when in the carrier mode and as the rear end of said smaller container when in the watercraft mode,
    said larger container having an end which acts as its front end in both of said modes,
    the forward end of one of said containers, when in its carrier mode, having a recess,
    the forward end of the other of said containers, when in its carrier mode, including projection means for entering said recess, in said carrier mode, for interconnecting said containers and aiding in holding them in place,
    in which said projection means is on the smaller container and said larger container defines said recess,
    in which said projection means is a horizontal plate extending forwardly from the front end of the smaller container when the latter is in said carrier mode.
2. A device as defined in claim 1, in which said projection means is a vertical plate extending forwardly from the front end of the smaller container when the latter is in the carrier mode.
3. A device for use as a car top carrier in a carrier mode and also for use as a boat in a watercraft mode, including:
    two dissimilar hollow thin shelled containers, one of said containers being larger than the other, said larger container having a closed top, two sides, and an open bottom, and the smaller container having an open top, two sides and a closed bottom, means for inter-connecting said containers to form a car-top carrier to provide said carrier mode, and means for inter-connecting said containers to form a small utility type watercraft to provide the watercraft mode,
    said smaller container having an end which acts as a rear end in the carrier mode and a front end in the watercraft mode,
    said larger container having an end which acts as a rear end in both of said modes, and
    the smaller container being the carrier when in the carrier mode and the stern section of the watercraft when in the watercraft mode and the larger container being the cover when in the carrier mode and the bow section when in the watercraft mode,
    said larger container, when in the carrier mode, encapsulating the smaller container with the larger container defining an indent extending along the inside of each said side of said larger container, each indent running longitudinally and coinciding with and contacting the smaller container and mating therewith at the open top of said smaller container to at least partially seal the smaller container and at least partially protect its contents from weather and road dust, with each said indent substantially spaced from both the closed top of the larger container and the open bottom of said container.

4. A device as defined in claim 3 in which each indent is substantially equidistant from the closed top of the larger container and the open bottom of said container.

5. A device as defined in claim 3 in which said sides of said smaller container terminate in top edges which mate with said indents respectively when said device is in the carrier mode.

6. A device as defined in claim 3 in which each indent is in the form of a cove.

7. A device as defined in claim 3 in which each indent is in the form of a groove.

8. A device as defined in claim 3 in which each indent is in the form of a channel.

9. A device for use as a car-top carrier in a carrier mode and also for use as a boat in a watercraft mode, including:

two dissimilar hollow thin shelled containers, one of said containers being larger than the other, said larger container having a closed top, two sides, and an open bottom and the smaller container having an open top, two sides, and a closed bottom, means for inter-connecting said containers to form a car-top carrier to provide said carrier mode, and means for inter-connecting said containers to form a small utility type watercraft to provide the watercraft mode, said smaller container having an end which acts as a rear end in the carrier mode and a front end in the watercraft mode, said larger container having an end which acts as a rear end in both of said modes, and the smaller container being the carrier when in the carrier mode and the stern section of the watercraft when in the watercraft mode and the larger container being the cover when in the carrier mode and the bow section when in the watercraft mode, said larger container having at least two holes in its rear end that align with similar sized holes in the end of the smaller container when the larger container encapsulates the smaller container in the carrier mode, said holes in both containers located above the normal waterline and also aligning with the same respective holes when the device is interconnected in the watercraft mode, elongated means securing the rear end of the larger container to the rear end of the smaller container, said elongated means extending through the holes in the larger container from the rear toward the front of said container and also extending through the holes in said smaller container and firmly connecting the rear end of the larger container to the rear end of the smaller container when the containers are utilized as a carrier in the carrier mode, and elongated means securing the front end of the larger container with the rear end of the smaller container, said last-named elongated means passing through the holes in the front end of the larger container and through the holes in the rear of the smaller container and firmly connecting the two containers to form a watercraft when in the watercraft mode.

10. A device as defined in claim 9 in which the elongated means comprises eye bolts and the holes in said smaller container are threaded.

11. A device as defined in claim 9 in which the elongated means comprises bolts, and the holes in said smaller containers are threaded.

12. A device for use as a boat in a watercraft mode and for use as a car-top carrier in a carrier mode, including:

two dissimilar hollow thin shelled containers, each of said containers having a closed bottom, two sides and an open top and means for inter-connecting said containers to form a small utility type watercraft to provide the watercraft mode, one container being larger than the other and being the bow section of said watercraft, in the watercraft mode, said smaller container being the carrier, and the larger container being inverted and constituting a cover that encapsulates the smaller container, in the carrier mode, means for attaching the smaller container to the car in the carrier mode to position the smaller container on the top of the car with its open top facing upwardly, said larger container being supported by said smaller container in the carrier mode.

13. A device as defined in claim 12, in which said larger container has an end which is a rear end in the watercraft mode and in which said smaller container has an end which is a front end in the watercraft mode, and means for securing said ends together in both of said modes.

14. A device as defined in claim 13 in which each of the side walls of said larger container has an indent that rests on the top of the smaller container in the carrier mode.

15. A device as defined in claim 13 including additional means for securing said containers together in the watercraft mode comprising an opening in one of said ends and a mating projection on the other of said ends.

16. A device as defined in claim 12 in which the larger container, when inverted, has a horizontal portion which rests on the top of the smaller container in the carrier mode.

17. A device as defined in claim 12 including means, for securing said containers together when the device is in said carrier mode.

18. A device as defined in claim 17 in which, in the carrier mode, the inner side wall of the larger container rests on the top of the smaller container along a line that is substantially spaced from both the top and the bottom of the larger container.

19. A device as defined in claim 12 in which said smaller container constitutes the sole support for the larger container in said carrier mode and comprises means for holding said larger container in position, in said carrier mode, without any direct connection between said larger container and the car.

* * * * *